United States Patent
Wu et al.

(10) Patent No.: US 9,162,360 B2
(45) Date of Patent: Oct. 20, 2015

(54) PROXIMITY SENSING METHOD, PROXIMITY SENSING APPARATUS AND MOBILE PLATFORM USING THE SAME

(71) Applicant: INDUSTRIAL TECHNOLOGY RESEARCH INSTITUTE, Hsinchu (TW)

(72) Inventors: Jia-Hsing Wu, Zhudong Township, Hsinchu County (TW); Chun-Hsien Liu, Taipei (TW); Ya-Hui Tsai, Pingjhen (TW); Po-Yi Li, Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 89 days.

(21) Appl. No.: 14/045,424

(22) Filed: Oct. 3, 2013

(65) Prior Publication Data

US 2014/0129029 A1    May 8, 2014

(30) Foreign Application Priority Data

Nov. 2, 2012  (TW) .............................. 101140855 A
Apr. 25, 2013  (TW) .............................. 102114844 A (51) Int. Cl.
*G05B 19/00* (2006.01)
*B25J 9/16* (2006.01)

(52) U.S. Cl.
CPC ..................... *B25J 9/1694* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,809,490 | B2 * | 10/2004 | Jones et al. | 318/568.12 |
| 7,020,701 | B1 * | 3/2006 | Gelvin et al. | 709/224 |
| 7,155,308 | B2 * | 12/2006 | Jones | 700/245 |
| 7,643,906 | B2 * | 1/2010 | Yu et al. | 700/255 |
| 2004/0030601 | A1 * | 2/2004 | Pond et al. | 705/16 |
| 2004/0236470 | A1 * | 11/2004 | Dooley et al. | 700/255 |

(Continued)

FOREIGN PATENT DOCUMENTS

| | | |
|---|---|---|
| CN | 2587027 Y | 11/2003 |
| CN | 100578963 C | 1/2010 |

(Continued)

OTHER PUBLICATIONS

Lenchner et al., "Towards Data Center Self-Diagnosis Using a Mobile Robot", ICAC '11, Jun. 14-18, 2011, 10 pages.

(Continued)

*Primary Examiner* — Jonathan L Sample
(74) *Attorney, Agent, or Firm* — Muncy, Geissler, Olds & Lowe, P.C.

(57) ABSTRACT

A proximity sensing apparatus is provided. The proximity sensing apparatus includes an encoded signal transmission unit, an interference signal transmission unit and a reception unit. The encoded signal transmission unit transmits an encoded signal, and the interference signal transmission unit transmits an interference signal. The interference signal interferes with the encoded signal to generate an interfered signal. The reception unit receives a sensing signal and outputs the sensing signal to a signal processing unit. The sensing signal is either the interfered signal or the encoded signal. The signal processing unit is electrically connected to the reception unit, and determines whether the sensing signal matches the encoded signal. The signal processing unit further outputs a proximity signal when the sensing signal does not match the encoded signal.

22 Claims, 13 Drawing Sheets

(56) References Cited

U.S. PATENT DOCUMENTS

| | | | |
|---|---|---|---|
| 2007/0016328 A1* | 1/2007 | Ziegler et al. | 700/245 |
| 2007/0192910 A1* | 8/2007 | Vu et al. | 901/17 |
| 2007/0244610 A1* | 10/2007 | Ozick et al. | 701/23 |
| 2008/0039974 A1* | 2/2008 | Sandin et al. | 700/258 |
| 2009/0030551 A1* | 1/2009 | Hein et al. | 700/253 |
| 2010/0030378 A1* | 2/2010 | Choi et al. | 700/245 |
| 2010/0040120 A1* | 2/2010 | Sharma | 375/219 |
| 2010/0145526 A1* | 6/2010 | Yamaguchi et al. | 700/275 |
| 2010/0148940 A1* | 6/2010 | Gelvin et al. | 340/286.02 |
| 2010/0324734 A1* | 12/2010 | Lee et al. | 700/258 |
| 2013/0098402 A1* | 4/2013 | Yoon et al. | 134/18 |
| 2014/0016113 A1* | 1/2014 | Holt et al. | 356/3.11 |
| 2014/0129027 A1* | 5/2014 | Schnittman | 700/253 |

FOREIGN PATENT DOCUMENTS

| | | |
|---|---|---|
| CN | 101893708 A | 11/2010 |
| CN | 101915917 B | 9/2012 |
| TW | 542739 | 7/2003 |
| TW | M272503 | 8/2005 |
| TW | M314354 | 6/2007 |
| TW | 200836690 | 9/2008 |
| TW | 201035710 | 10/2010 |
| TW | M404370 | 5/2011 |

OTHER PUBLICATIONS

Gavrilut et al., "Obstacles Avoidance Method for an Autonomous Mobile Robot using Two IR Sensors", Journal of Electrical and Electronics Engineering, Jan. 2008, pp. 194-197.

Wen et al., "Infrared Sensor Based Target Following Device for a Mobile Robot", International Conference on Advanced Intelligent Mechatronics (AIM2011), Jul. 3-7, 2011, pp. 49-54.

Benet et al., "Using infrared sensors for distance measurement in mobile robots", Robotics and Autonomous Systems, 2002, pp. 255-266, vol. 40.

Korba et al., "Active Infrared Sensors for Mobile Robots", IEEE Transactions on Instrumentation and Measurement, Apr. 1994, pp. 283-287, vol. 43, No. 2.

Dumitru et al., "Methods and algorithms for motion control of walking mobile robot with obstacle avoidance", Proceedings of the European Computing Conference, 2011, pp. 404-409.

* cited by examiner

PROXIMITY SENSING METHOD, PROXIMITY SENSING APPARATUS AND MOBILE PLATFORM USING THE SAME

This application claims the benefit of Taiwan application Serial No. 101140855 and 102114844, filed Nov. 2, 2012 and Apr. 25, 2013, the disclosure of which is incorporated by reference herein in its entirety.

TECHNICAL FIELD

The disclosed embodiments relate in general to a sensing apparatus, and more particularly to a proximity sensing method, a proximity sensing apparatus and a mobile platform using the same.

BACKGROUND

With fast developments in automation techniques and artificial intelligence, the role of robots is becoming increasingly important. Robots have gradually evolved towards service robots in the recently years, particularly towards cleaning robots. Cleaning robots, applied to a large and diversified scope, can be mainly divided into two categories—an industrial category and a household category. For example, a household floor cleaning robot, also referred to as a self-propelled vacuum cleaner, has rapidly emerged to become a market mainstream product and possesses a high development potential.

A current self-propelled cleaning robot usually performs an anti-falling detection via infrared sensing, which commonly adopts strength of received energy as a determination reference. A sensing result obtained according to such determination reference may be affected due to interferences from ground colors and ambient light sources, to even lead to a robot falling event. Further, in order to counteract environmental effects, circuit parameters are designed and adjusted based on element characteristics, and a complex amplifying filter circuit is often inevitable. When moving on a black floor, a current self-propelled cleaning robot is prone to conclude a misjudged falling event if circuit parameters are inappropriately adjusted, resulting in a malfunction such as a standstill of the robot.

SUMMARY

The disclosure is directed to a proximity sensing method, a proximity sensing apparatus and a mobile platform using the same.

According to one embodiment, a proximity sensing apparatus is provided. The proximity sensing apparatus comprises an encoded signal transmission unit, an interference signal transmission unit and a reception unit. The encoded signal transmission unit transmits an encoded signal, and the interference signal transmission unit transmits an interference signal. The interference signal interferes with the encoded signal to generate an interfered signal. The reception unit receives a sensing signal and outputs the sensing signal to a signal processing unit. The sensing signal is either the interfered signal or the encoded signal. The signal processing unit is electrically connected to the reception unit, and determines whether the sensing signal matches the encoded signal. The signal processing unit further outputs a proximity signal when the sensing signal does not match the encoded signal.

According to another embodiment, a mobile platform is provided. The mobile platform comprises a proximity sensing unit, a movement unit, a movement control unit, a signal processing unit and a housing. The proximity sensing apparatus comprises an encoded signal transmission unit, an interference signal transmission unit and a reception unit. The encoded signal transmission unit transmits an encoded signal, and the interference signal transmission unit transmits an interference signal. The interference signal interferes with the encoded signal to generate an interfered signal. The reception unit receives a sensing signal and outputs the sensing signal to a signal processing unit. The sensing signal is either the interfered signal or the encoded signal. The signal processing unit is electrically connected to the reception unit. The movement control unit is electrically connected to the movement unit and the signal processing unit. The housing accommodates the movement unit and the movement control unit. The proximity sensing apparatus is installed at a surface of the housing. The signal processing unit determines whether the sensing signal matches the encoded signal, and outputs the proximity signal. The proximity signal is output to the movement control unit when the sensing signal does not match the encoded signal to control the movement unit.

According to an alternative embodiment, a proximity sensing method is provided. The method comprises steps of: transmitting an encoded signal; transmitting an interference signal for interfering with the encoded signal to generate an interfered signal; receiving a sensing signal, which is either the interfered signal or the encoded signal; determining whether the sensing signal matches the encoded signal; and outputting a proximity signal when the sensing signal does not match the encoded signal.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 1:
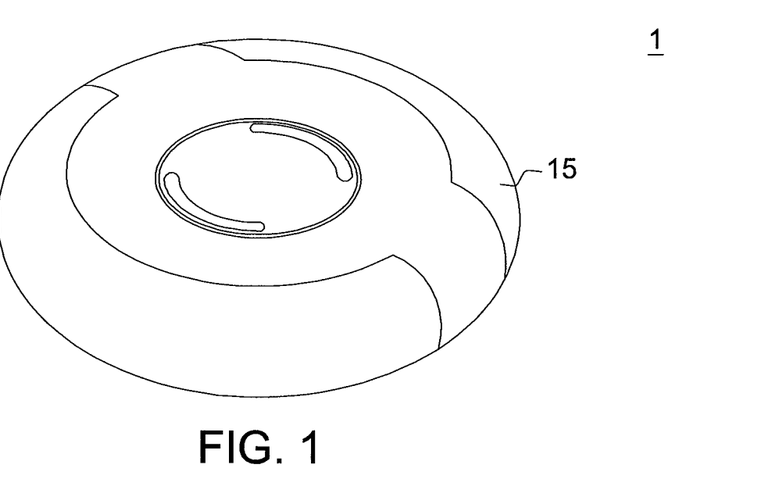
FIG. 1 is a schematic diagram of an appearance of a mobile platform according to a first embodiment.
Figure 2:
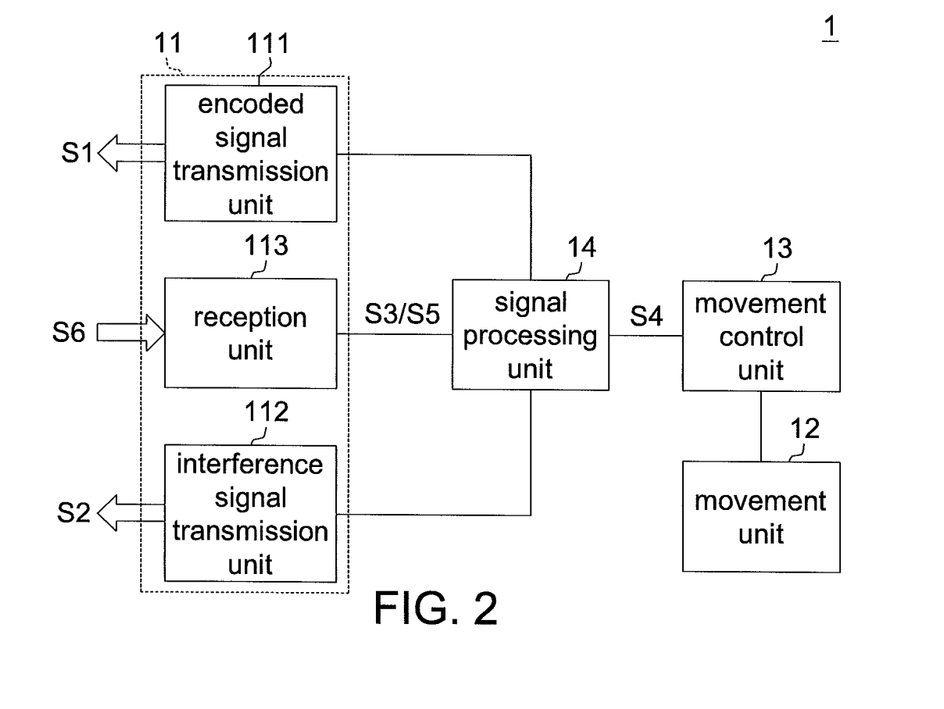
FIG. 2 is a block diagram of a mobile platform according to the first embodiment.

FIG. 1 shows a schematic view of an appearance of a mobile platform according to a first embodiment. FIG. 2 shows a block diagram of a mobile platform according to the first embodiment. Referring to FIGS. 1 and 2, a mobile platform 1 comprises a proximity sensing apparatus 11, a movement unit 12, a movement control unit 13, a signal processing unit 14, and a housing 15. The signal processing unit 14 is electrically connected to the proximity sensing apparatus 11 and the movement control unit 13. For example, either the movement control unit 13 or the signal processing unit 14 is implemented by a micro control unit (MCU) or a digital signal processor (DSP), and the movement unit 12 is a wheel. The movement control unit 13 controls the movement unit 12 to move, stop or turn. The housing 15 accommodates the movement unit 12 and the movement control unit, and the proximity sensing apparatus 11 is installed at a surface of the housing 15. In one embodiment, the signal processing unit 14 is disposed on the housing 15.

The proximity sensing apparatus 11 comprises an encoded signal transmission unit 111, an interference signal transmission unit 112 and a reception unit 113. The signal processing unit 14 is electrically connected to the reception unit 113. For example, either the encoded signal transmission unit 111 or the interference signal transmission unit 112 is an infrared transmitter, and the reception unit 113 is an infrared receiver. The reception unit 113 receives a sensing signal S6 and transmits the sensing signal S6 to the signal processing unit 14.

The signal processing unit 14 controls the encoded signal transmission unit 111 to transmit an encoded signal S1, and controls the interference signal transmission unit 112 to transmit an interference signal S2. When an object, e.g., an obstacle, a wall or a surface of a substance, is approached, the interference signal S2 interferes with the encoded signal S1 to generate an interfered signal. The reception unit 113 receives a sensing signal S6, and transmits the sensing signal S6 to the signal processing unit 14. The signal processing unit 14 determines whether the sensing signal S6 matches the encoded signal S1, and outputs a proximity signal S4 when the sensing signal S6 does not match the encoded signal S1.

When the proximity sensing apparatus 11 approaches an object and the interference signal S2 interferes with the encoded signal S1, the signal processing unit 14 determines whether the sensing signal S6 matches the encoded signal S1. In contrast, when the proximity sensing apparatus 11 moves away from an object, the interference signal S2 does not interfere with the encoded signal S1. For instance, the proximity sensing apparatus 11 approaching an object may refer to the proximity sensing apparatus 11 approaching a wall or an obstacle. Alternatively, the proximity sensing apparatus 11 approaching an object may refer to the proximity sensing apparatus 11 maintaining a distance from the ground and away from stairs.

Figure 3:
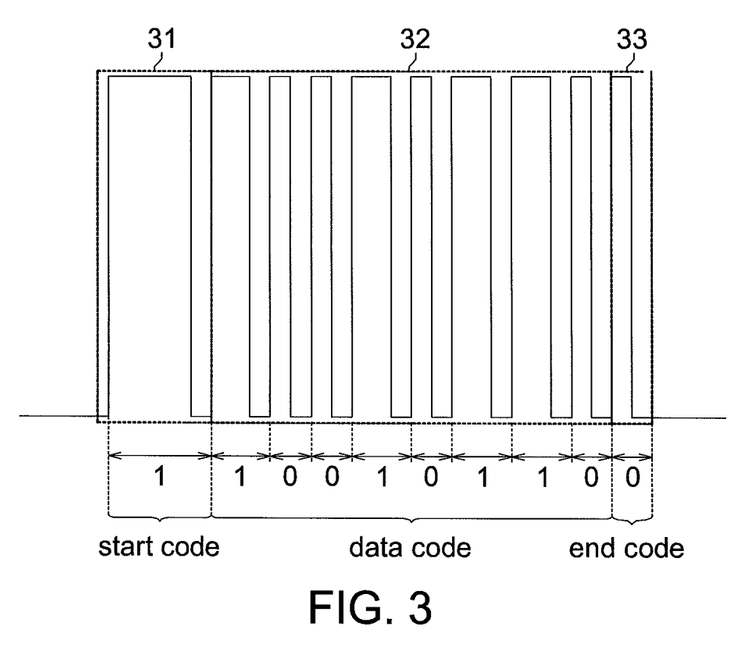
FIG. 3 is a waveform diagram of an encoded signal according to the first embodiment.
Figure 4:
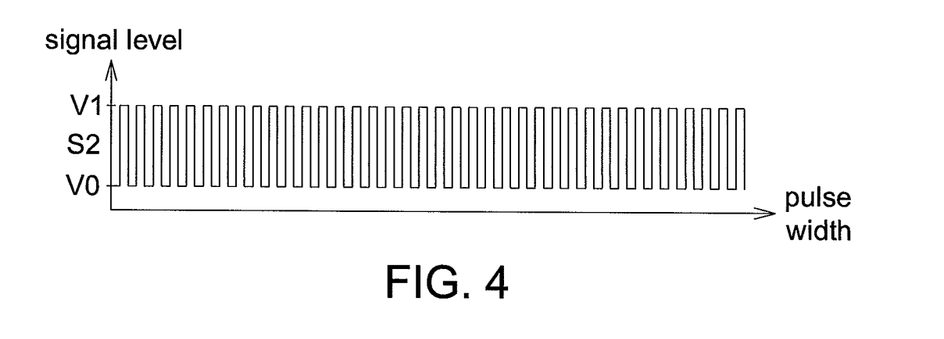
FIG. 4 is a waveform diagram of an interference signal according to the first embodiment.
Figure 5:
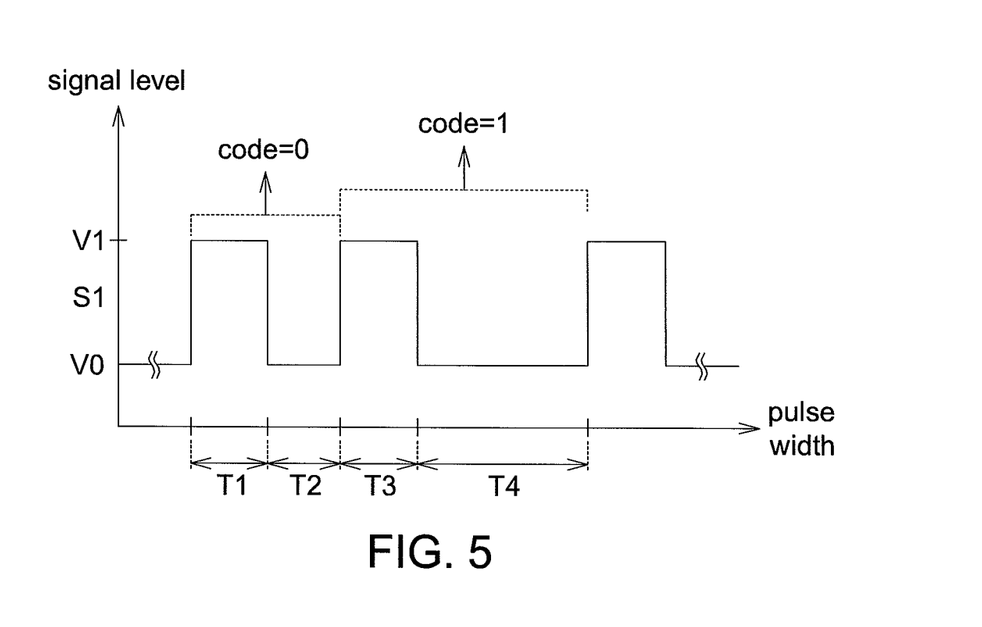
FIG. 5 is a schematic diagram of an encoding principle according to the first embodiment.

FIG. 3 shows a waveform diagram of an encoded signal according to the first embodiment. FIG. 4 shows a waveform diagram of an interference signal according to the first embodiment. FIG. 5 shows a schematic diagram of an encoding principle according to the first embodiment. Referring to FIGS. 3, 4 and 5, the vertical axis represents a signal level, and the horizontal axis represents a pulse width. For example, the encoded signal S1 is an infrared encoded signal a shown in FIG. 3, and the interference signal S2 is an infrared constant-frequency signal as shown in FIG. 4. For example, the encoded signal S1 has a start code 31, a data code 32 and an end code 33. The data code 32 is between the start code 31 and the end code 33. All of the start code 31, the data code 32 and the end code 33 change between a low signal level V0 and a high signal level V1.

For illustration purposes, a part of the encoded signal S1 is depicted in FIG. 5 as an example. The encoded signal S1 maintains at the high signal level V1 across a pulse width T1, and maintains at the low signal level V0 across a pulse width T2 adjacent to the pulse width T1. The code is defined as 0 when the pulse width T1 equals the pulse width T2. The encoded signal maintains at the high signal level V1 across a pulse width T3, and maintains at the low signal level V0 across a pulse width T4 adjacent to the pulse width T3. The code is defined as 1 when the pulse width T3 does not equal the pulse width T4. In short, the code is defined as 0 when the pulse width across which the high signal level V1 is maintained equals the pulse width across which the low signal level V0 is maintained. Conversely, the code is defined as 1 when the pulse width across which the high signal level V1 is maintained differs from the pulse width across which the low signal level V0 is maintained. In the above description, although the encoding principle is explained as an example, a decoding principle may be the same as the foregoing encoding principle. Based on the encoding/decoding principle, it is obtained that the start code 31, the data code 32 and the end code 33 in FIG. 3 are respectively 1, 10010110 and 0, and so the encoded signal S1 is 1100101100. It should be noted that the encoding/decoding principle is not limited to the details set forth in the above description. In practice, the coding format may be defined by a user based on actual requirements.

The infrared constant-frequency signal shown in FIG. 4, rather than a limitation, is taken as an example for illustrating the interference signal S2. In an alternative embodiment, the interference signal S2 may be an infrared encoded signal. When an infrared encoded signal is adopted as the interference signal S2, a launching angle of the encoded signal transmission unit 111 is greater than a launching angle of the interference signal transmission unit 112 since interference may occur without reflection.

Figure 6:
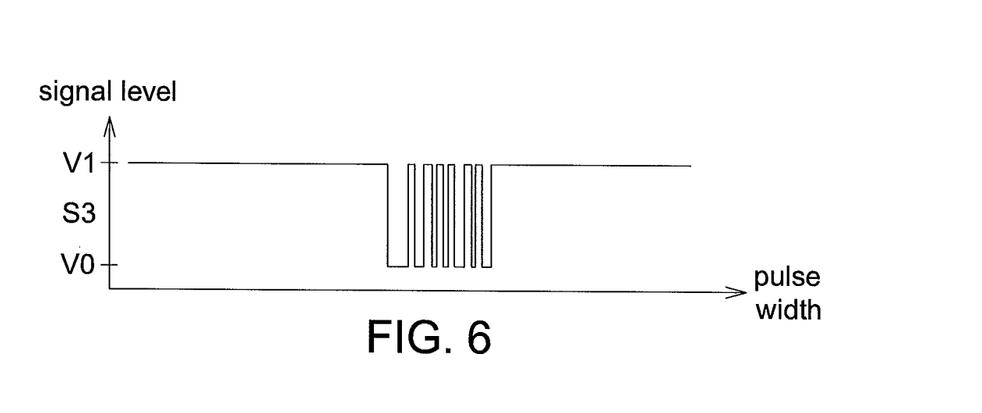
FIG. 6 is a schematic diagram of interfered data S3.
Figure 7:
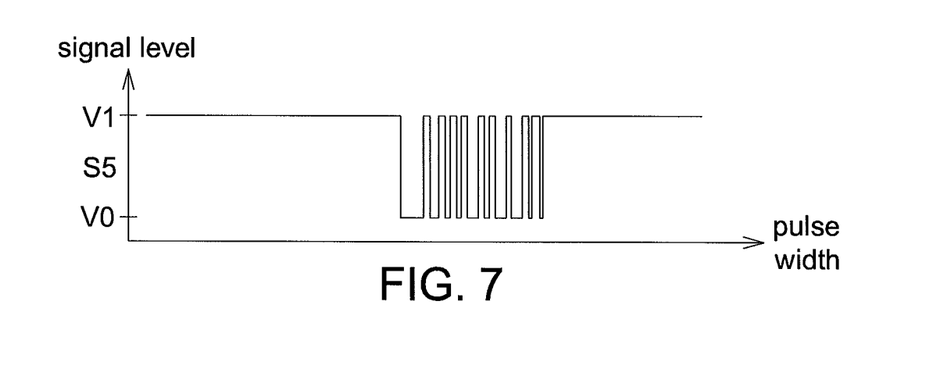
FIG. 7 is a schematic diagram of encoded data S5.

FIG. 6 shows a schematic diagram of interfered data S3. FIG. 7 shows a schematic diagram of encoded data S5. Referring to FIGS. 2, 6 and 7, when the proximity sensing apparatus 11 approaches an object, the interference signal S2 interferes with the encoded signal S1 to generate an interfered signal. The interfered signal is received as the sensing signal S6 by the reception unit 113, and then decoded by the reception unit 113 into the interfered data S3 shown in FIG. 6. According to the foregoing encoding/decoding principle, the interfered data S3 does not represent 1100101100. Thus, the signal processing unit 14 determines that the sensing signal S6 does not match the encoded signal S1, and outputs a proximity signal S4.

Conversely, when the proximity sensing apparatus 11 moves away from an object, the interference signal S2 no longer interferes with the encoded signal S1. The encoded signal S1 is then received as the sensing signal S6 by the reception unit 116, and is decoded into encoded data S5 shown in FIG. 7. According to the foregoing encoding/decoding principle, the encoded data S5 is represented as 1100101100. Thus, the signal processing unit 14 determines that the sensing signal S6 matches the encoded signal S1.

Figure 8:
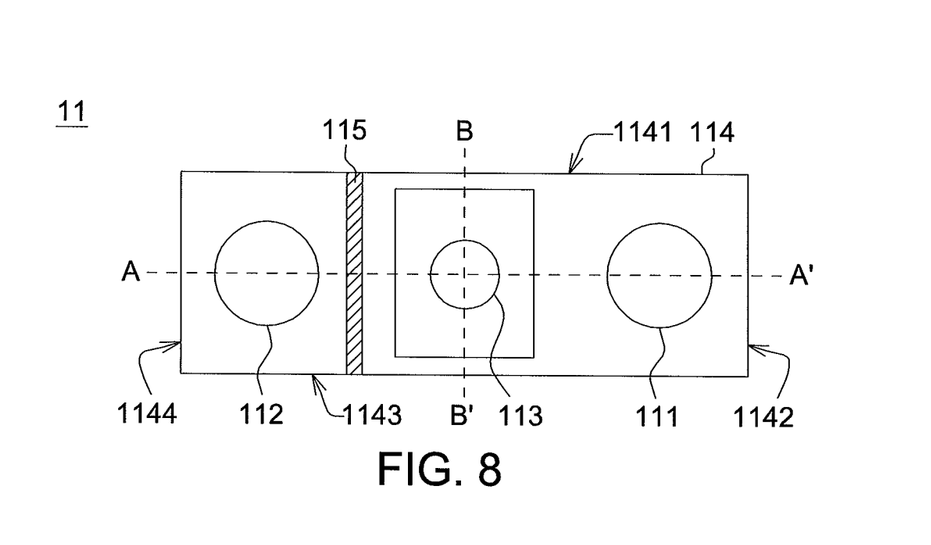
FIG. 8 is a bottom view of a first type of the proximity sensing apparatus according to the first embodiment.
Figure 9:
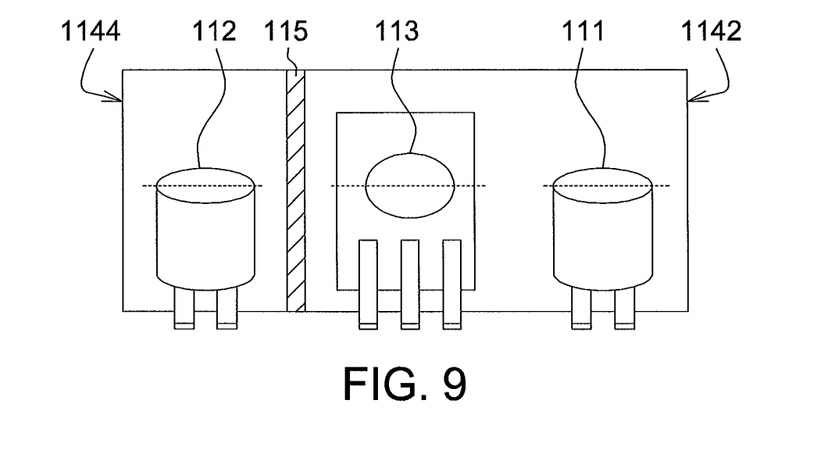
FIG. 9 is a sectional view of the first type of the proximity sensing apparatus along a section line AA' shown in FIG. 8.
Figure 10:
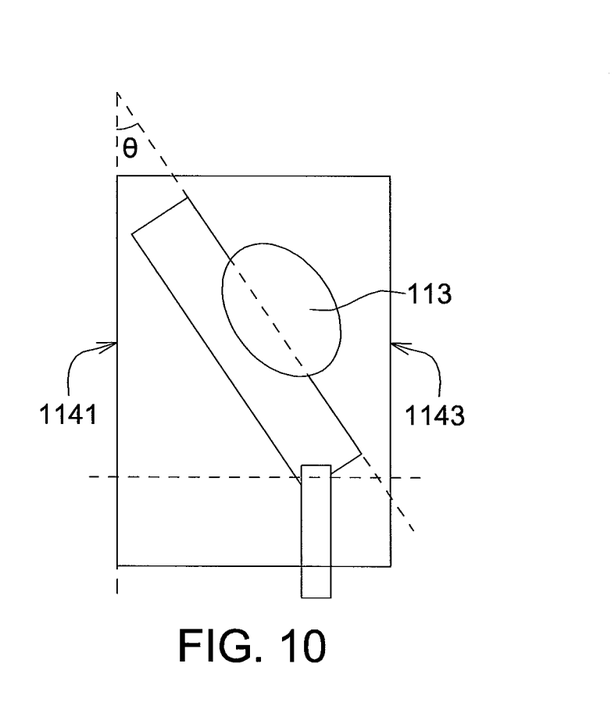
FIG. 10 is another sectional view of the first type of the proximity sensing apparatus along a section line BB' shown in FIG. 8.
Figure 23:
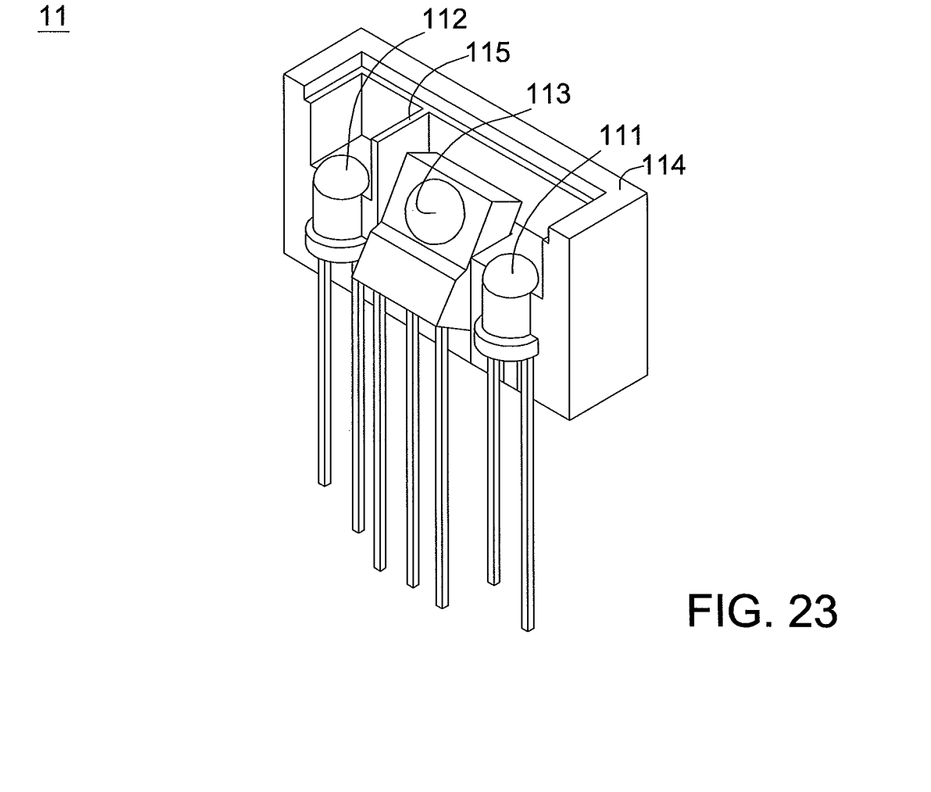
FIG. 23 shows a partial schematic elevation view of the first type of the proximity sensing apparatus according to the first embodiment.

FIG. 8 shows a bottom view of a first type of the proximity sensing apparatus according to the first embodiment. FIG. 9 shows a sectional view of the first type of the proximity sensing apparatus along a section line AA' shown in FIG. 8. FIG. 10 shows another sectional view of the first type of the proximity sensing apparatus along a section line BB' shown in FIG. 8. FIG. 23 is a partial schematic elevation view of the first type of the proximity sensing apparatus according to the first embodiment. Referring to FIGS. 8, 9, 10 and 23, for example, the encoded signal transmission unit 111, the interference signal transmission unit 112 and the reception unit 113 are in a linear arrangement, with the reception unit 113 disposed between the encoded signal transmission unit 111 and the interference signal transmission unit 112.

Further, in an embodiment, the proximity sensing apparatus 11 further comprises an integrated housing 114 and a partition plate 115. The partition plate 115, being an opaque material and located between the interference signal transmission unit 112 and the reception unit 113, is capable of isolating interferences scattered by the interference signal transmission unit 112 upon a proximal end of the reception unit 113. The integrated housing 114 comprises housing sides 1141 to 1144. The housing side 1141 is opposite the housing side 1143, and the housing side 1142 is opposite the housing side 1144. The housing side 1142 is neighboring to the encoded signal transmission unit 111, and the housing side 1144 is neighboring to the interference signal transmission unit 112. The housing side 1141 and the housing side 1143 are neighboring to the encoded signal transmission unit 111, the interference signal transmission unit 112 and the reception unit 113. An included angle θ is formed between the reception unit 113 and the housing side 1141.

Figure 11:
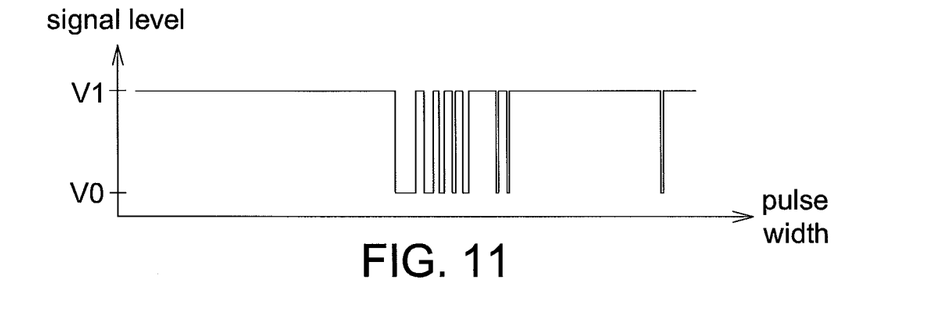
FIG. 11 is a waveform diagram of a decoded signal output from a reception unit when an included angle is 45 degrees.
Figure 12:
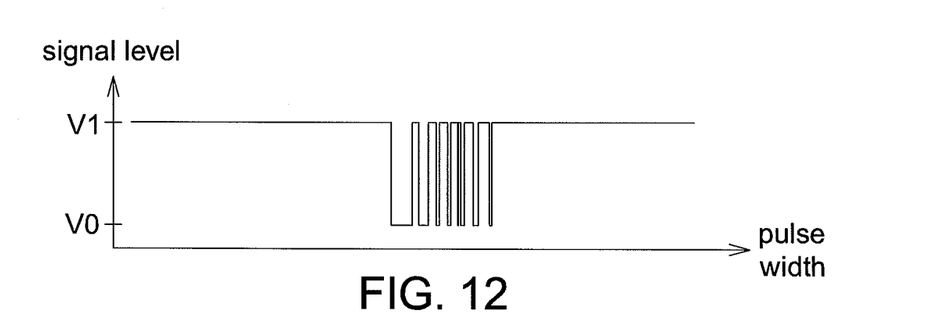
FIG. 12 is a waveform diagram of a decoded signal output from a reception unit when an included angle is 30 degrees.
Figure 13:
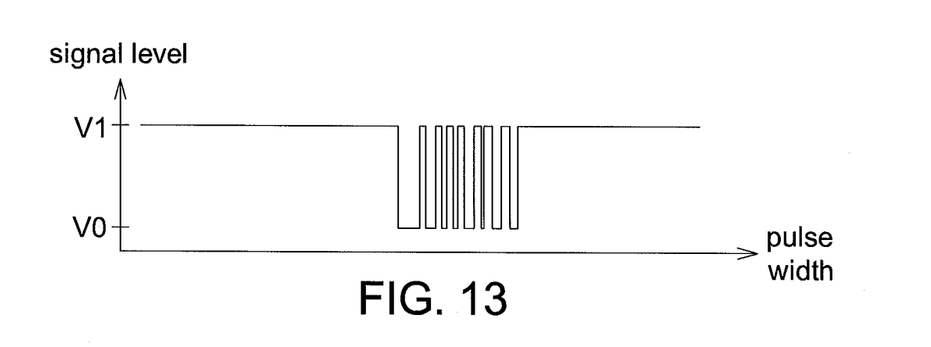
FIG. 13 is a waveform diagram of a decoded signal output from a reception unit when an included angle is 10 degrees.

FIG. 11 shows a waveform diagram of a decoded signal output by the reception unit when the included angle is 45 degrees. FIG. 12 shows a waveform diagram of a decoded signal output by the reception unit when the included angle is 30 degrees. FIG. 13 shows a waveform diagram of a decoded signal output by the reception unit when the included angle is 10 degrees. For example, the included angle θ may be between 10 to 45 degrees. For example, a signal waveform diagram of an abnormal code output by reception unit 113 is shown in FIG. 11 in which the included angle is 45 degrees, in FIG. 12 in which the included angle is 30 degrees, and in FIG. 13 in which the included angle is 10 degrees. When the included angle is 0 degree, i.e., when the reception unit 113 is placed completely horizontal, the interference signals of the interference signal transmission unit 112 may directly sabotage/interfere the reception of the reception unit 113 with respect to the encoded signal transmission unit 111. When the included angle is greater than 45 degrees, an effective sensing distance of the sensing apparatus for sensing an object may be reduced.

Figure 14:
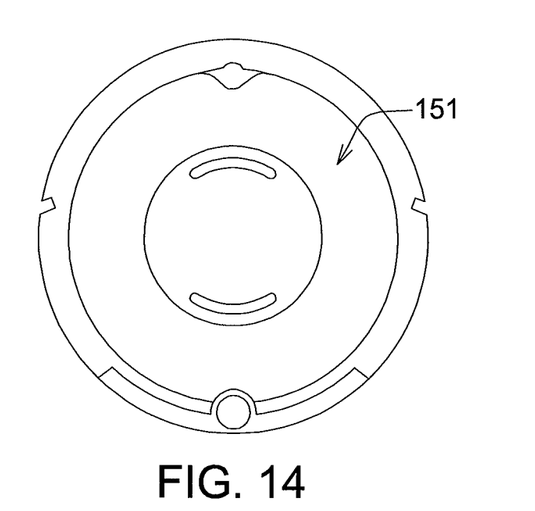
FIG. 14 is a top view of a mobile platform according to the first embodiment.
Figure 15:
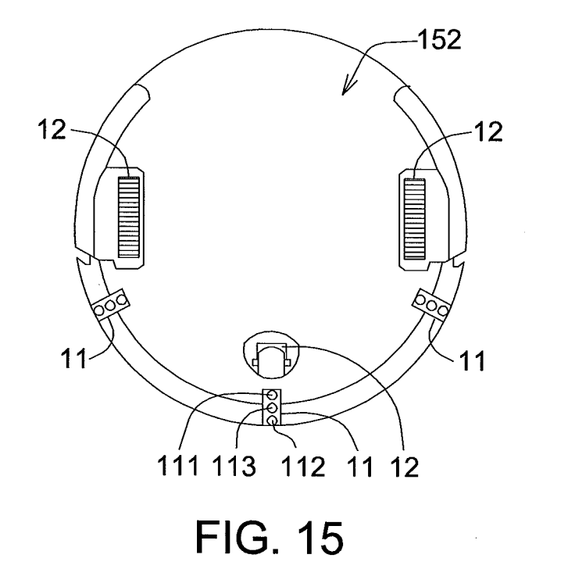
FIG. 15 is a bottom view of a mobile platform according to the first embodiment.
Figure 16:
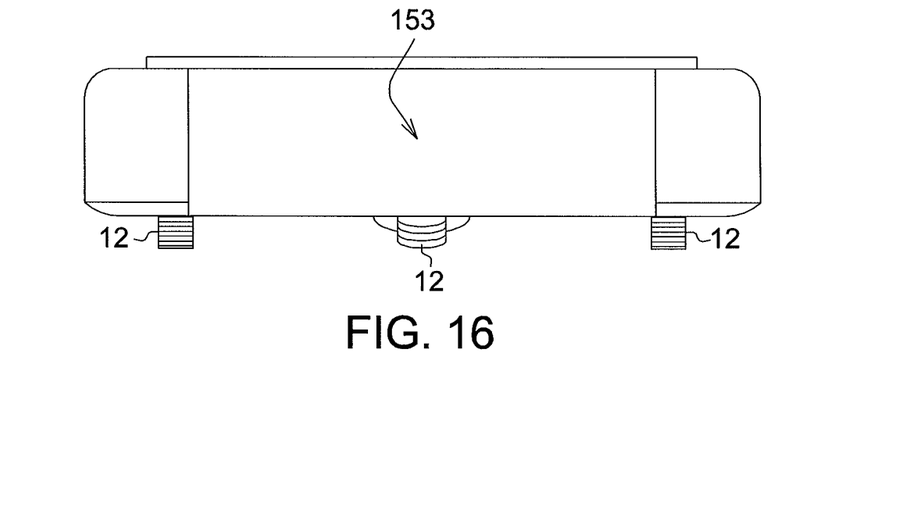
FIG. 16 is a side view of a mobile platform according to the first embodiment.

FIG. 14 shows a top view of a mobile platform according to the first embodiment. FIG. 15 shows a bottom view of a mobile platform according to the first embodiment. FIG. 16 shows a side view of a mobile platform according to the first embodiment. Surfaces of the housing 15 include an upper surface 151 in FIG. 14, a lower surface 152 in FIG. 15 and a side surface 153 in FIG. 16. The upper surface 151 is opposite the lower surface 152, and the side surface 153 is connected with the upper surface 151 and the lower surface 152. A distance between the encoded signal transmission unit 111 and a center of the lower surface 152 is smaller than a distance between the interference signal transmission unit 112 and the center of the lower surface 152.

Figure 17:
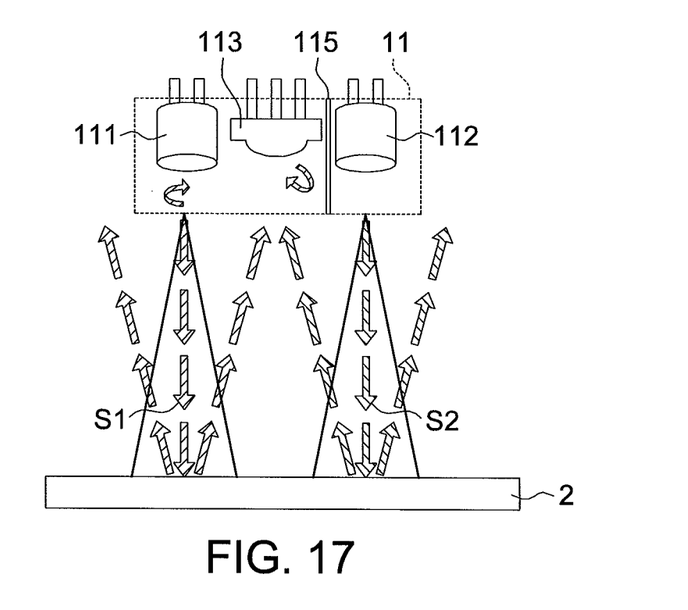
FIG. 17 is a schematic diagram of detecting a non-lapsed condition.
Figure 18:
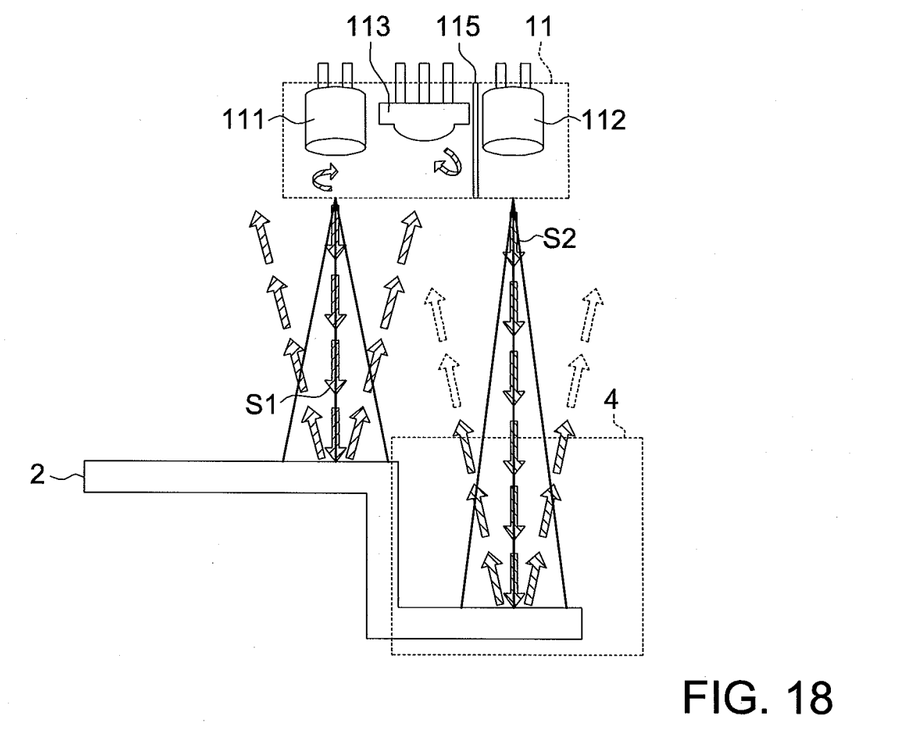
FIG. 18 is a schematic diagram of detecting a lapsed condition.

FIG. 17 shows a schematic diagram of detecting a non-lapsed condition. FIG. 18 shows a schematic diagram of detecting a lapsed condition. In FIGS. 15 and 16, it is assumed that the substance surface is a ground plane. Referring to FIGS. 15, 17 and 18, it is observed that the interference signal S2 transmitted by the interference transmission unit 112 interferes the encoded signal S1 when encountering an obstacle or a substance surface. For example, the substance surface is a ground plane 2. Referring to FIGS. 2, 15, 17 and 18, the proximity sensing apparatus 11 installed at the lower surface 152 is capable of preventing the mobile platform 1 from being fallen off. When the mobile platform 1 is under a normal moving state, the interference signal S2 persistently interferes with the encoded signal S1 as being close to the ground plane 2, and so the sensing signal S6 received by the reception unit 113 is the interfered signal. When the sensing signal S6 is the interfered signal, the signal processing unit 14 determines that the sensing signal S6 does not match the encoded signal S1, and outputs a proximity signal S4.

Conversely, when the mobile platform 1 encounters a stair 4, the interference signal S2 is attenuated from reflection and becomes incapable of interfering with the encoded signal S1. The sensing signal S6 received by the reception unit 113 is then the non-interfered encoded signal S1. As such, the signal processing unit 14 determines that the sensing signal S6 matches the encoded signal S1 which indicates the mobile platform 1 is to fall off shortly, and the movement control unit 13 will control the mobile platform to stop or turn to prevent the mobile platform 1 from falling off.

Second Embodiment

Figure 19:
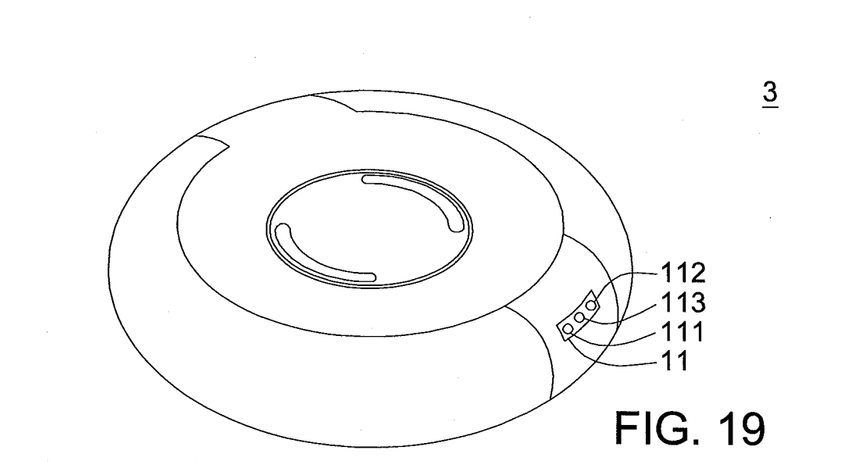
FIG. 19 is a schematic diagram of an appearance of a mobile platform according to a second embodiment.
Figure 20:
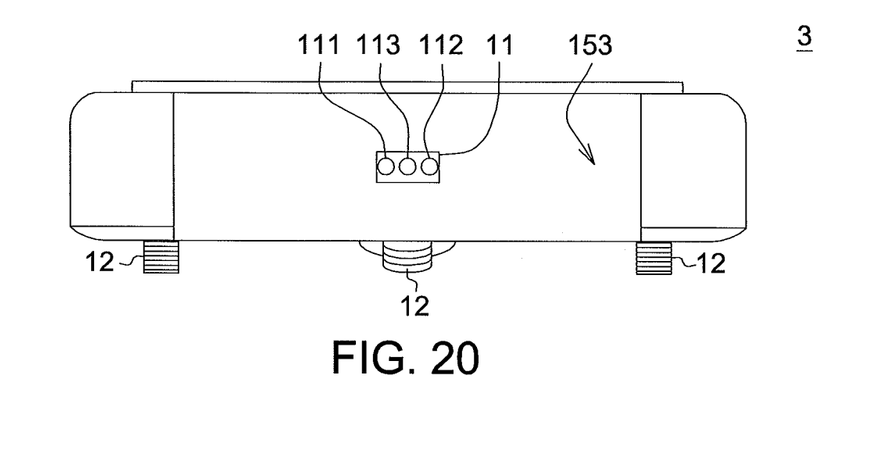
FIG. 20 is a side view of a mobile platform according to the second embodiment.

FIG. 19 shows a schematic diagram of an appearance of a mobile platform according to a second embodiment. FIG. 20 shows a side view of a mobile platform according to the second embodiment. Referring to FIGS. 2, 19 and 20, a main difference of the second embodiment from the first embodiment is that, instead of being disposed to the lower surface 152, the proximity sensing apparatus 11 in a mobile platform 3 is disposed at the side surface 153. As indicated in FIGS. 19, 20, 21 and 22, the interference signal S2 transmitted by the interference signal transmission unit 112 interferes the encoded signal S1 when encountering an obstacle or a wall surface 5. By disposing the proximity sensing apparatus 11 at the side surface 153, the mobile platform 3 may detect whether an obstacle or a wall surface is encountered.

Figure 21:
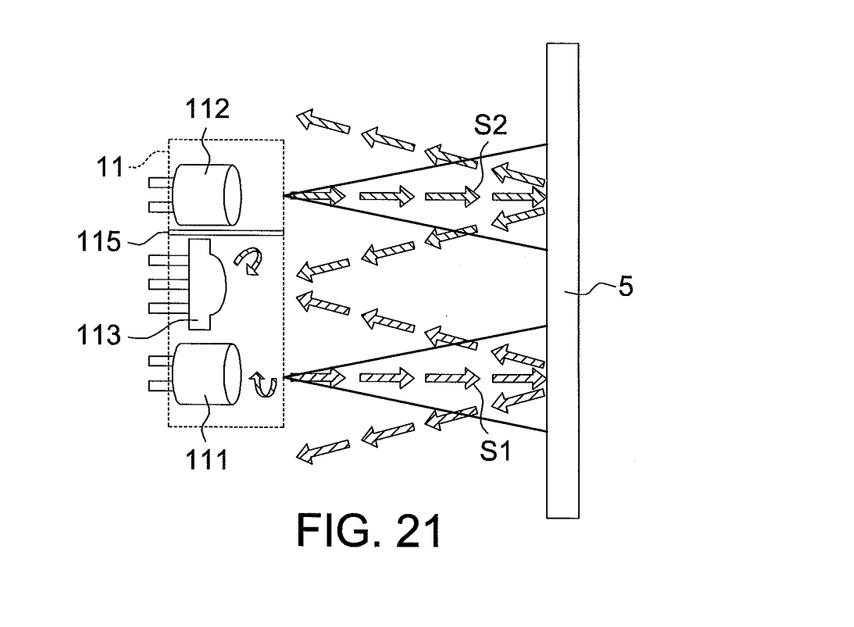
FIG. 21 is a schematic diagram of a proximity sensing apparatus approaching a wall surface.
Figure 22:
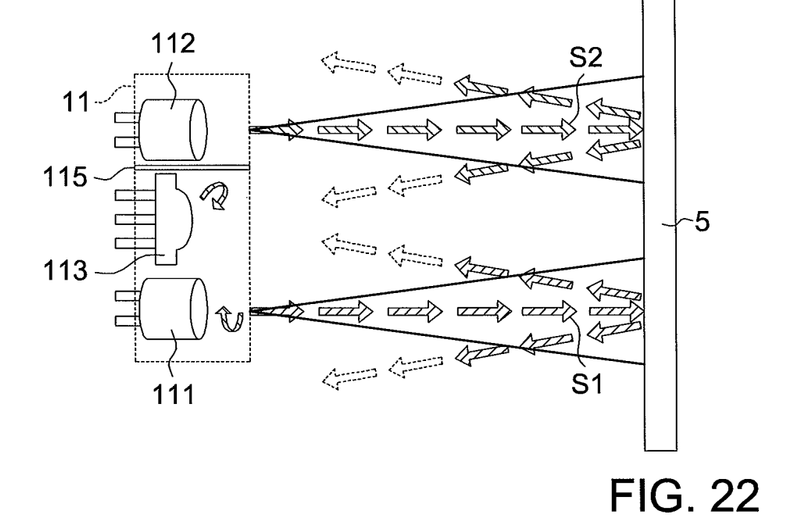
FIG. 22 is a schematic diagram of a proximity sensing apparatus moving away from a wall surface.

FIG. 21 shows a schematic diagram of a proximity sensing apparatus approaching a wall surface. FIG. 22 shows a schematic diagram of a proximity sensing apparatus moving away from a wall surface. When the proximity sensing apparatus 11 approaches a wall surface 5, as being close to a wall surface 5, the interference signal S2 persistently interferes with the encoded signal S1, and the sensing signal S6 received by the reception unit 113 is then the interfered signal. Thus, the signal processing unit 14 determines that the sensing signal S6 does not match the encoded signal S1 when the sensing signal S6 is the interfered signal, and outputs a proximity signal S4. When it is determined that the sensing signal S6 does not match the encoded signal S1, the movement control unit 13 controls the movement unit 12 to stop or to turn.

Conversely, when the mobile platform 1 moves away from the wall surface 5, the interference signal S2 is attenuated from reflection and becomes incapable of interfering with the encoded signal S1. The sensing signal S6 received by the reception unit 113 is then the non-interfered encoded signal S1. When the sensing signal S6 is the encoded signal S1, the signal processing unit 14 determines that the sensing signal S6 matches the encoded signal S1.

Third Embodiment

Figure 24:
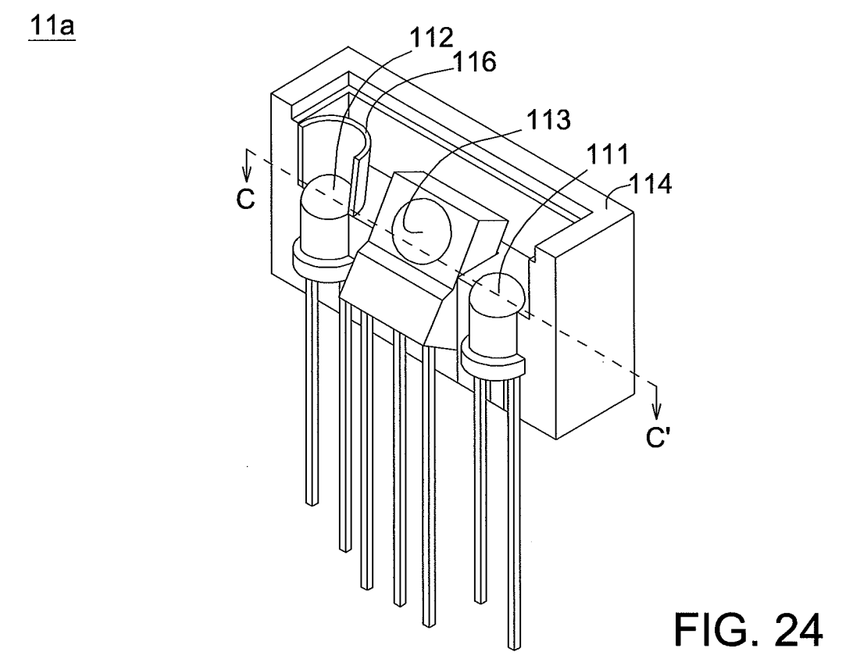
FIG. 24 shows a partial schematic elevation view of a second type of a proximity sensing apparatus according to a third embodiment.
Figure 25:
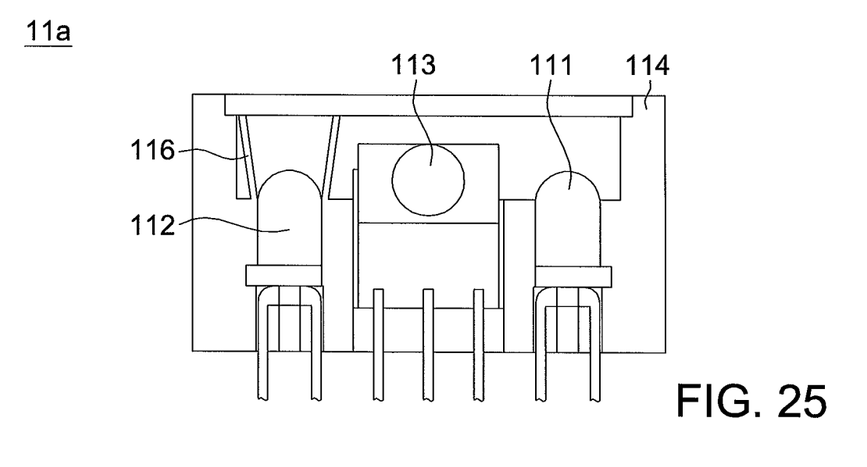
FIG. 25 shows a sectional view of the second type of the proximity sensing apparatus along a section line CC' shown in FIG. 24.
Figure 26:
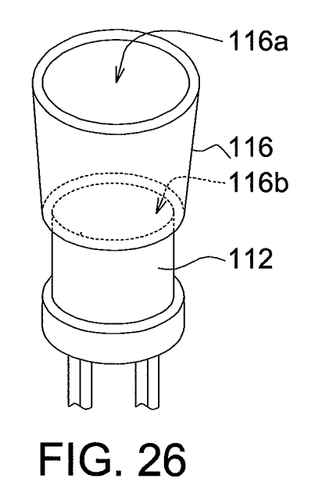
FIG. 26 shows a schematic diagram of a tapered hollow sleeve and an interference signal transmission unit.

FIG. 24 shows a partial schematic elevation view of a second type of a proximity sensing apparatus according to a third embodiment. FIG. 25 shows a sectional view of the second type of the proximity sensing apparatus along a section line CC' shown in FIG. 24. FIG. 26 shows a schematic diagram of a tapered hollow sleeve and an interference signal transmission unit. Referring to FIGS. 24, 25 and 26, a main difference of the third embodiment from the first embodiment is that, a proximity sensing apparatus 11a further comprises a tapered hollow sleeve 116 (e.g., a barrel), which replaces the design of the partition plate in the above embodiments. The tapered hollow sleeve 116 is an opaque material and is disposed at a front-end of the interference signal transmission unit 112, with one side having a smaller sectional area along an axial direction of the tapered hollow sleeve 116 being located closer to the interference signal transmission unit 112. In other words, the tapered hollow sleeve 116 comprises a front-end opening 116a and a rear-end opening 116b. The front-end opening 116a is greater than the rear-end opening 116b, and a distance between the interference signal transmission unit 112 and the front-end 116a is greater than a distance between the interference signal transmission unit 112 and the rear-end opening 116b. For example, the tapered angle may be 8 degrees for limiting a transmission angle range of the interference signal transmission unit 112. As such, in addition to isolating interferences of near-end scattering, transmission and scattering angles of interference signals may also be controlled for promoting focusing effects according to actual requirements.

Through signal encoding and interference as described in the embodiments, the detection for an obstacle can be prevented from effects of not only light and an ambient temperature but also colors of object surfaces and a material emission rate. Moreover, a rear-end signal processing circuit can be simplified to further reduce costs and enhance the ease of use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A proximity sensing apparatus, comprising:
an encoded signal transmission unit, for transmitting an encoded signal;
an interference signal transmission unit, for transmitting an interference signal; the interference signal interfering with the encoded signal to generate an interfered signal; and
a reception unit, for receiving a sensing signal and transmitting the sensing signal to a signal processing unit electrically connected to the reception unit; the sensing signal being either the interfered signal or the encoded signal;
wherein, the signal processing unit determines whether the sensing signal matches the encoded signal, and outputs a proximity signal when the sensing signal does not match the encoded signal,
wherein the encoded signal comprises a start code, a data code and an end code; the start code, the data code and the end code change between a low signal level and a high signal level; the encoded signal maintains at the high signal level across a first pulse width, and maintains at the low signal level across a second pulse width adjacent to the first pulse width; a code is defined as 0 when the first pulse width equals the second pulse width, and the code is defined as 1 when the first pulse width differs from the second pulse width.

2. The proximity sensing apparatus according to claim 1, wherein the reception unit is disposed between the encoded signal transmission unit and the interference signal transmission unit.

3. The proximity sensing apparatus according to claim 1, further comprising: a partition plate, located between the interference signal transmission unit and the reception unit.

4. The proximity sensing apparatus according to claim 1, wherein the encoded signal transmission unit, the interference signal transmission unit and the reception unit are in a linear arrangement.

5. The proximity sensing apparatus according to claim 1, further comprising an integrated housing; wherein, the integrated housing comprises a first side, a second side, a third side and a fourth side; the first side is opposite the third side, and the second side is opposite the fourth side; the first side and the third side are neighboring to the encoded signal transmission unit; and an included angle is formed between the reception unit and the first side.

6. The proximity sensing apparatus according to claim 5, wherein the included angle is between 10 degrees and 45 degrees.

7. The proximity sensing apparatus according to claim 1, further comprising a tapered hollow sleeve located at a front-end of the interference signal transmission unit.

8. The proximity sensing apparatus according to claim 7, wherein the tapered hollow sleeve comprises a front-end opening and a rear-end opening; the front-end opening is greater than the rear-end opening, and a distance between the interference signal transmission unit and the front-end opening is greater than a distance between the interference signal transmission unit and the rear-end opening.

9. A mobile platform, comprising:
a proximity sensing apparatus, comprising:
an encoded signal transmission unit, for transmitting an encoded signal;
an interference signal transmission unit, for transmitting an interference signal;
the interference signal interfering with the encoded signal to generate an interfered signal; and a reception unit, for receiving a sensing signal and transmitting the sensing signal to a signal processing unit electrically connected to the reception unit; the sensing signal being either the interfered signal or the encoded signal;

a movement unit;

a movement control unit, electrically connected to the movement unit and the signal processing unit; and a housing, for accommodating the movement control unit and the movement unit, the proximity sensing apparatus being installed at a surface of the housing;

wherein the signal processing unit determines whether the sensing signal matches the encoded signal, and outputs a proximity signal when the sensing signal does not match the encoded signal, and wherein the encoded signal comprises a start code, a data code and an end code; the start code, the data code and the end code change between a low signal level and a high signal level; the encoded signal maintains at the high signal level across a first pulse width, and maintains at the low signal level across a second pulse width adjacent to the first pulse width; a code is defined as 0 when the first pulse width equals the second pulse width, and the code is defined as 1 when the first pulse width differs from the second pulse width.

10. The mobile platform according to claim 9, wherein the reception unit is disposed between the encoded signal transmission unit and the interference signal transmission unit.

11. The mobile platform according to claim 9, wherein the proximity sensing apparatus further comprises a partition plate located between the interference signal transmission unit and the reception unit.

12. The mobile platform according to claim 9, further comprising a tapered hollow sleeve located at a front-end of the interference signal transmission unit.

13. The proximity sensing apparatus according to claim 12, wherein the tapered hollow sleeve comprises a front-end opening and a rear-end opening; the front-end opening is greater than the rear-end opening, and a distance between the interference signal transmission unit and the front-end opening is greater than a distance between the interference signal transmission unit and the rear-end opening.

14. The mobile platform according to claim 9, wherein the encoded signal transmission unit, the interference signal transmission unit and the reception unit are in a linear arrangement.

15. The mobile platform according to claim 9, wherein the proximity sensing apparatus further comprises an integrated housing; the integrated housing comprises a first side, a second side, a third side and a fourth side; the first side is opposite the third side, and the second side is opposite the fourth side; the first side and the third side are neighboring to the encoded signal transmission unit; and an included angle is formed between the reception unit and the first side.

16. The mobile platform according to claim 15, wherein the included angle is between 10 degrees and 45 degrees.

17. The mobile platform according to claim 9, wherein the surface of the housing comprises an upper surface, a lower surface and a side surface; the upper surface is opposite the lower surface, and the side surface is connected with the upper surface and the lower surface; and the proximity sensing apparatus is installed at the lower surface.

18. The mobile platform according to claim 17, wherein the movement control unit controls the movement unit to stop or to turn the movement unit when the signal processing unit determines that the sensing signal matches the encoded signal.

19. The mobile platform according to claim 18, wherein a distance between the encoded signal transmission unit to a center of the lower surface is smaller than a distance between the interference signal transmission unit to the center of the lower surface.

20. The mobile platform according to claim 9, wherein the housing comprises an upper surface, a lower surface and a side surface; the upper surface is opposite to the lower surface, and the side surface is connected with the upper surface and the lower surface; and the proximity sensing apparatus is installed at the side surface.

21. The mobile platform according to claim 20, wherein the movement control unit controls the movement unit to stop or to turn the movement unit when the signal processing unit determines that the sensing signal matches the encoded signal.

22. A proximity sensing method, comprising:

transmitting an encoded signal;

transmitting an interference signal, the interference signal interfering with the encoded signal to generate an interfered signal;

receiving a sensing signal, the sensing signal being either the interfered signal or the encoded signal;

determining whether the sensing signal matches the encoded signal; and outputting a proximity signal when the sensing signal does not match the encoded signal, wherein the encoded signal comprises a start code, a data code and an end code; the start code, the data code and the end code change between a low signal level and a high signal level; the encoded signal maintains at the high signal level across a first pulse width, and maintains at the low signal level across a second pulse width adjacent to the first pulse width; a code is defined as 0 when the first pulse width equals the second pulse width, and the code is defined as 1 when the first pulse width differs from the second pulse width.

* * * * *